United States Patent
Zimmermann et al.

(10) Patent No.: US 6,672,278 B2
(45) Date of Patent: Jan. 6, 2004

(54) METHOD AND DEVICE FOR CONTROLLING AN INTERNAL COMBUSTION ENGINE

(75) Inventors: Klaus Zimmermann, Vienna (AT); Tobias Lang, Benningen (DE); Jens Leideck, Stuttgart (DE); Klaus Sassen, Marbach/N (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,826

(22) PCT Filed: Jul. 26, 2001

(86) PCT No.: PCT/DE01/02824
§ 371 (c)(1),
(2), (4) Date: Aug. 7, 2002

(87) PCT Pub. No.: WO02/14670
PCT Pub. Date: Feb. 21, 2002

(65) Prior Publication Data
US 2003/0029417 A1 Feb. 13, 2003

(30) Foreign Application Priority Data
Aug. 16, 2000 (DE) .......................................... 100 39 786

(51) Int. Cl.⁷ .................................................. F02B 3/00
(52) U.S. Cl. ..................................... 123/299; 123/446
(58) Field of Search ................................ 123/299, 300, 123/446, 294

(56) References Cited

U.S. PATENT DOCUMENTS 5,826,425 A    10/1998   Canale et al.
6,516,782 B1 *  2/2003   Thomas ....................... 123/436

FOREIGN PATENT DOCUMENTS

DE    41 33 856     4/1993
EP    0 786 592     7/1997
EP    1 077 321     2/2001

* cited by examiner

Primary Examiner—Bibhu Mohanty
(74) Attorney, Agent, or Firm—Kenyon & Kenyon

(57) ABSTRACT

A device and a method for controlling an internal combustion engine. At least one first partial injection and one second partial injection are provided per injection cycle. One of the two partial injections is shifted in response to certain operating conditions being active. A correction value for a variable characterizing the delivery period is determined as a function of the shift of the partial injection.

8 Claims, 4 Drawing Sheets

METHOD AND DEVICE FOR CONTROLLING AN INTERNAL COMBUSTION ENGINE

BACKGROUND INFORMATION

A method and a device for controlling an internal combustion engine is described, for example, in the MTZ Motortechnische Zeitschrift [Engine Technology Journal] 58 (1997), no. 10, page 572 ff. The system described there is usually referred to as a common-rail system. Using the system described there, it is possible to carry out at least one first partial injection and one second partial injection during an injection cycle. In this context, at least one pre-injection and/or at least one post-injection are usually carried out in addition to a so-called main injection.

When controlling in such a manner, using two partial injections, a so-called minimum control interval must generally be maintained. This is used in order for the system to assume a defined initial state, so that unwanted injection-quantity fluctuations do not occur during the subsequent control. As a rule, the accuracy of one of the control events is of greater importance. If, for example, a post-injection used to regenerate a particle filter or an Nox catalyst is carried out, then this post-injection must be executed as accurately as possible with regard to its start of delivery and the amount.

If the minimum control interval between the two control events is not attained in this operating mode, then the main injection may have to be advanced. In the case of shifting the main injection, the result may be a different injection quantity, given the same delivery period. This is especially the case, when the injection quantity is a function of the start of delivery for the injection. This is particularly true for cam-driven injection systems, such as pump-nozzle units and/or solenoid-controlled distributor pumps.

Other variables characterizing the delivery period may be used in place of the delivery period. Examples of these include the triggering time of an actuator, and the injection period. The equivalent also holds true for the start of delivery. Other variables characterizing the start of delivery may be used in place of the start of delivery. Examples of these include the start of injection or the start of control.

The result of calculating the delivery period anew, using the new start of delivery, is a change in the interval between the two partial injections. Under unfavorable circumstances, it is necessary to correct the start of delivery again. This results in a highly time-consuming calculation of the control data for the main injection.

A similar problem occurs while carrying out a pre-injection and a main injection. In this case, the main injection has a higher priority. The case, in which the first injection has a higher priority and the second injection is shifted, may also occur.

SUMMARY OF THE INVENTION

The procedure of the present invention allows the new parameters, in particular the control (triggering) signals for the two injections, to be determined in a simple manner, in which case the minimum control interval is reliably maintained. In addition, the computational expenditure is markedly reduced.

DETAILED DESCRIPTION

Figure 1:
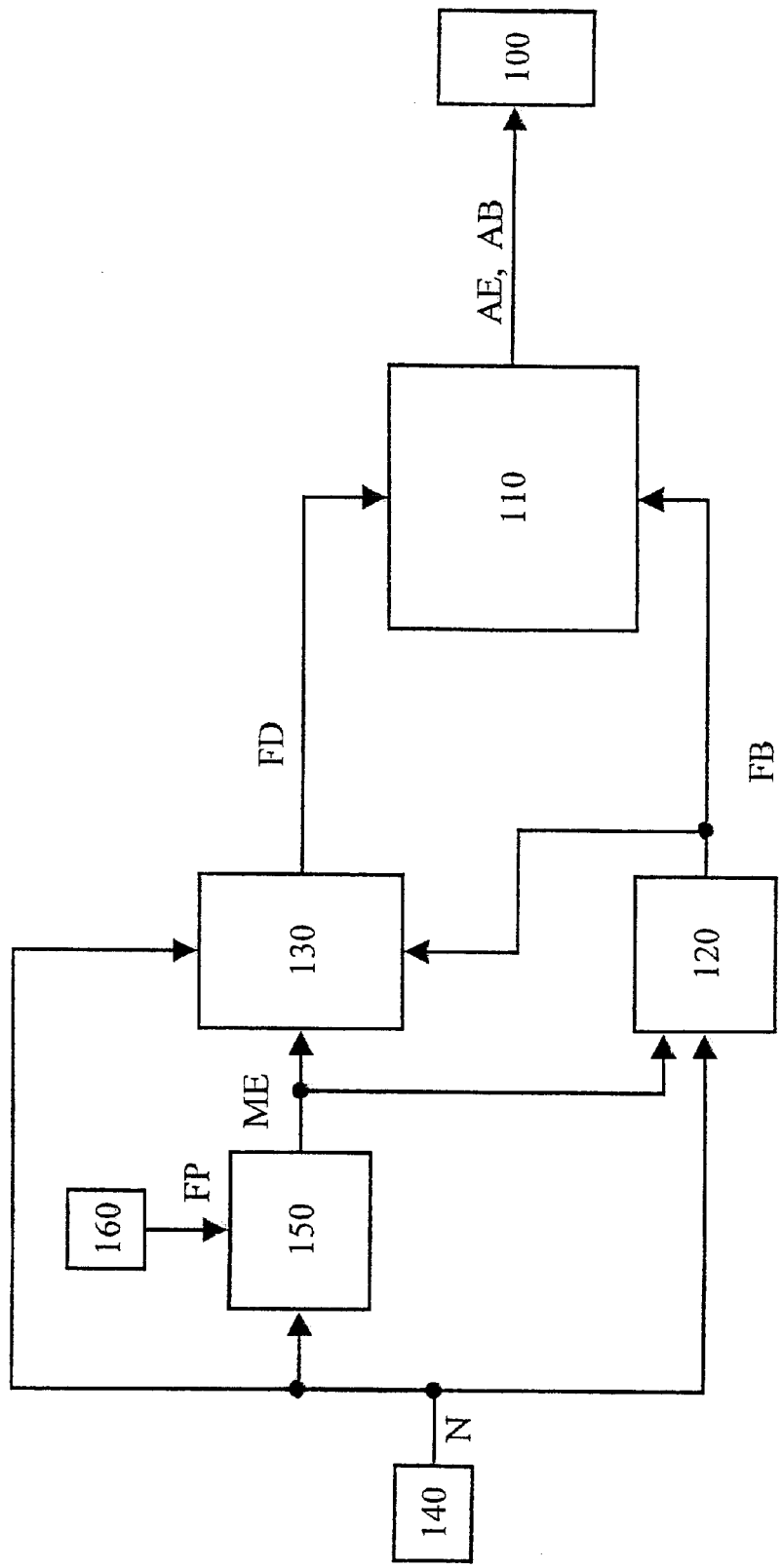
FIG. 1 shows a block diagram of the procedure according to the present invention.

The fundamental elements that are important for understanding the present invention are represented in FIG. 1, using a block diagram. An actuator 100, which controls the amount of fuel to be injected into the internal combustion engine, receives control signals AE and AB from a control means (triggering means) 110. Control signal AB determines the start of control and, thus, the start of fuel delivery into the engine. Control signal AE determines the end of control and, thus, the end of injection and the injection period. Control means 110 receives signals FB and FD from a delivery-start determination means 120 and a delivery-period determination means 130, respectively. The delivery-period determination means and the delivery-start determination means preferably include characteristic maps, in which the respective variables are stored as a function of different operating parameters. To this end, delivery-period determination means 130 receives a signal from an engine-speed sensor 140 and a fuel-quantity selection means 150. Accordingly, delivery-start determination means 120 also receives the appropriate signals. In addition to the represented signals, other signals may also be processed. Delivery-period determination means 130 also processes delivery-start signal FB of delivery-start determination means 120. The delivery-period determination means and the delivery-start determination means receive a fuel-quantity signal ME from fuel-quantity selection means 150. To this end, the fuel-quantity selection means evaluates the output signal of engine-speed sensor 140 and a driver-command input means 160.

Fuel-quantity selection means 150 calculates the fuel-quantity variable ME characterizing the amount of fuel to be injected, using at least engine speed N and driver command FP. Using this variable ME representing the amount of fuel to be injected, engine speed N, and possibly other variables, delivery-start determination means 120 generates a signal, which characterizes start of control FB. This is preferably an angular crank-shaft or camshaft position, at which the injection begins. Using engine speed N and variable ME representing the amount of fuel to be injected, delivery-period determination means 130 generates a signal that characterizes delivery period FD. In this case, it is preferably an angle or a time, about which or for which the crank shaft or camshaft must rotate while the fuel injection occurs.

In camshaft-driven injection systems, such as pump-nozzle units or solenoid-controlled distributor pumps, the injection quantity is a function of the cam speed and, therefore, the start of delivery for the injection. Therefore, delivery period FD is also made a function of start of delivery FB. Using desired start of delivery FB and delivery period FD, control means 110 generates control signals AB and AE to be received by actuator 100. Solenoid valves or piezoelectric actuators are preferably used as actuators. Depending on the control signal AB or AE, the actuator is triggered so as to enable or interrupt the injection.

Figure 2:
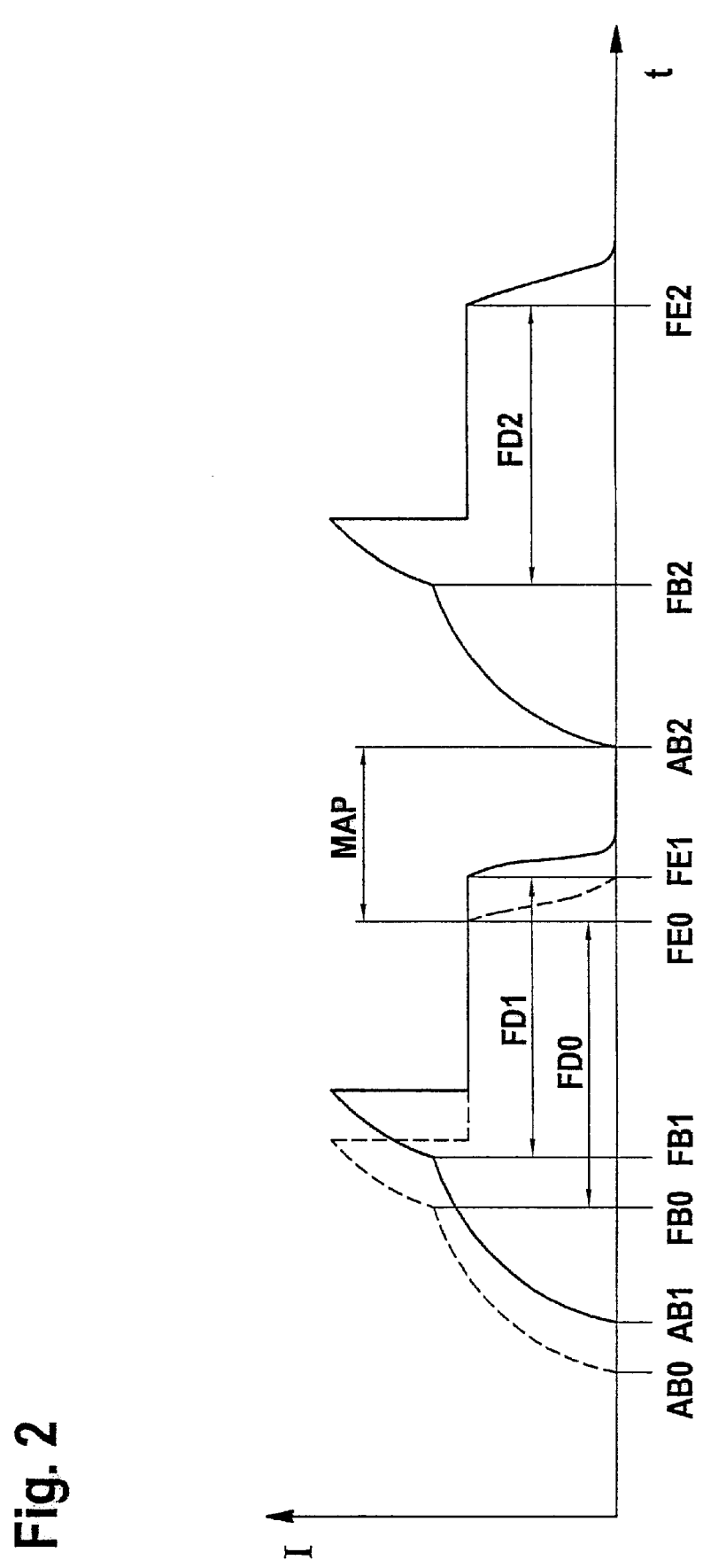
FIG. 2 shows various signals plotted versus time.

In FIG. 2, the current flowing through a solenoid valve used as an actuator is exemplarily plotted versus time t. The conditions for an injection, which is divided into two partial injections, are plotted with solid lines. The variables for the first partial injection are denoted by 1, and those for the second partial injection are denoted by 2.

The start of control for the second partial injection occurs at time AB2. As a result, the current through the solenoid valve increases. At time FB2, the valve switches on and the injection begins. This instance is referred to as start of delivery FB2. After the valve switches on, the current increases further for a short time and is then limited to a low holding current. At time FE2, the control ends and the current decreases to zero. The interval between start of delivery FB2 and end of delivery FE2 is referred to as delivery period FD2 of the second partial injection.

The current likewise increases at control start AB1 of the first partial injection, the first partial injection beginning at time FB1 and ending at end of delivery FE1.

Duration of first partial injection FD1 is determined by start of delivery FB1 and end of delivery FE1.

A minimal control interval must be maintained between the two injections. This is used to allow the entire system to assume a defined initial state. This means that a minimum interval MAP must be maintained after end of delivery FE1 of the first partial injection, up to control start AB2 of the second partial injection. If this is not maintained as represented in FIG. 2, then appropriate measures must be taken.

In the exemplary embodiment represented, the interval between the end of delivery and the start of control is defined as the control interval. The interval between the end of control or the end of delivery of the first partial injection and the start of delivery of the second partial injection may also be defined as the control interval.

In the exemplary embodiment represented, the second partial injection has a higher priority and may not be changed, due to reasons of engine technology. Therefore, the present invention provides for the first partial injection being advanced by a certain amount, in order that minimum interval MAP is maintained between the end of delivery of the first partial injection and the start of control of the second partial injection. An appropriately shifted, partial injection is drawn in with a dashed line.

The corresponding variables such as delivery period FD0, start of delivery FB0, end of delivery FE0, and start of control AB0 bear the identifier 0. The problem with such an injection advance is that, in various systems having a fixed injection quantity, the control period depends on the start of delivery.

If end of delivery FE0 of the shifted, first partial injection is predetermined by start of control AB2 of the second partial injection and minimum interval MAP, and start of delivery FB0 of the shifted partial injection is determined by the end of delivery of the shifted, first injection and delivery period FD0, then the delivery period must be corrected because of the changed start of delivery, in order to attain a constant amount of injected fuel. This in turn results in end of delivery FE0 shifting. In this context, one must differentiate between two cases. If the delivery period increases due to the changed start of delivery, then the minimum interval is not maintained. If the delivery period becomes shorter, then the interval becomes too large. In both cases, it is necessary to shift the start of delivery again and change the delivery period.

Therefore, a plurality of calculation steps is necessary for ascertaining the desired data for the first partial injection; in each case, the delivery period having to be calculated from an appropriate characteristic field, using the engine speed, the fuel quantity, and/or the start of delivery.

In a method for controlling an internal combustion engine, in which at least one first partial injection and one second partial injection are provided per injection cycle, the present invention provides for one of the two partial injections being shifted in the presence of certain operating states. In addition, a correction value for a variable characterizing the delivery period is determined as a function of the shift of the partial injection. In the exemplary embodiment represented, one of the two partial injections is shifted, when the interval between the two partial injections is less than a threshold value. In this context, the procedure is not limited to two partial injections. It may also be used, when more than two partial injections occur per metering cycle. Furthermore, the procedure for correcting the delivery period may also be used, when a partial injection is shifted for other reasons.

Figure 3A:
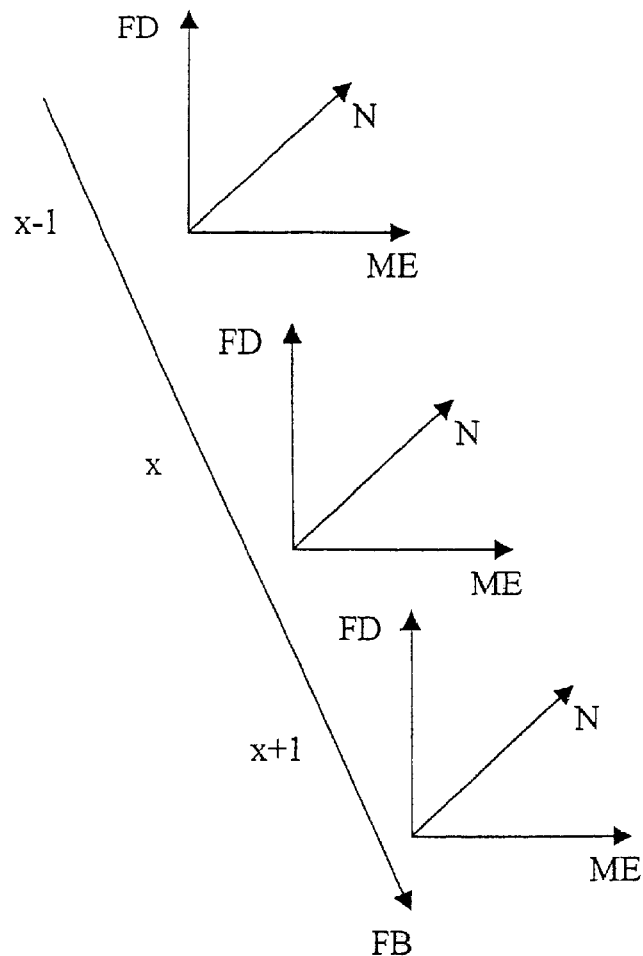
FIGS. 3a and 3b show various characteristic maps.

According to the present invention, delivery period FD is stored in a four-dimensional characteristic map as a function of fuel-quantity variable ME, engine speed N, and start of delivery FB, the four-dimensional characteristic map representing the essential element of delivery-period determination means 130. To improve the above-mentioned problem, the present invention provides for the delivery period being calculated as a function of an engine-speed value and a fuel-quantity value, for three different values of the start of delivery. These three delivery starts are referred to in FIG. 3a as X−1, X, and X+1. As a rule, these three starts of delivery yield three different delivery periods FD(X−1), FD(X), and FD(X+1). These three values for the delivery period and the start of delivery define two straight lines. This linear relationship between the start of delivery and the delivery period is only valid for a fixed engine speed and a fixed injection quantity.

According to the present invention, the start of delivery for the shifted injection and, thus, the delivery period for the shifted injection are now determined, using the three pairs of calculated values for the start of delivery and the corresponding delivery period. In so doing, a value earlier (less) than or equal to the delivery start of the unshifted, first partial injection is selected for start of delivery FB(X), and a value later (greater) than or equal to the delivery start of the unshifted, first partial injection is selected for start of delivery FB(X+1). The earliest possible, sensible control start of the shifted, first partial injection is selected for start of control FD(X−1). As a rule, shifted start of control FB0 will be between the value FD(X−1) and the value FB(X).

The correction value for the delivery period is determined, using at least two pairs of values, which characterize a start of delivery and a delivery period. The pairs of values are preferably fetched out of a characteristic field, as a function of a variable characterizing the start of delivery and at least one further variable.

It is particularly advantageous that the correction values are determined as a function of the least two pairs of values, using an interpolation, preferably a linear interpolation.

A specific embodiment of such an interpolation is described below. Start of delivery FB0 of the shifted, first partial injection is obtained from end of delivery FE0 of the shifted, first partial injection and delivery period FD0 of the shifted, first partial injection, according to the formula:

$$FB0 = FE0 - FD0$$

End of delivery FE0 of the shifted, first partial injection is obtained from start of control AB2 of the second partial injection and minimum control interval MAP, according to the formula:

$$FE0 = AB2 - MAP$$

Figure 3B:
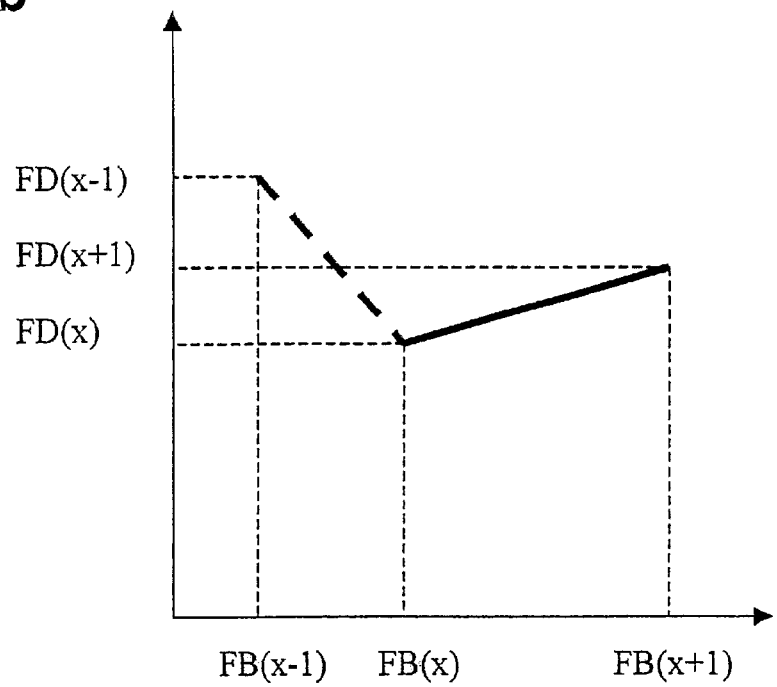

The straight-line equations, which define the line segments of the characteristics in FIG. 3b, are used for shifted start of delivery FD0.

Delivery start FB0 of the shifted, first partial injection is determined, using these two equations.

Delivery period FD0 of the shifted, first partial injection results from the difference of delivery end FE0 and delivery start FB0 of the shifted, first partial injection.

Figure 4:
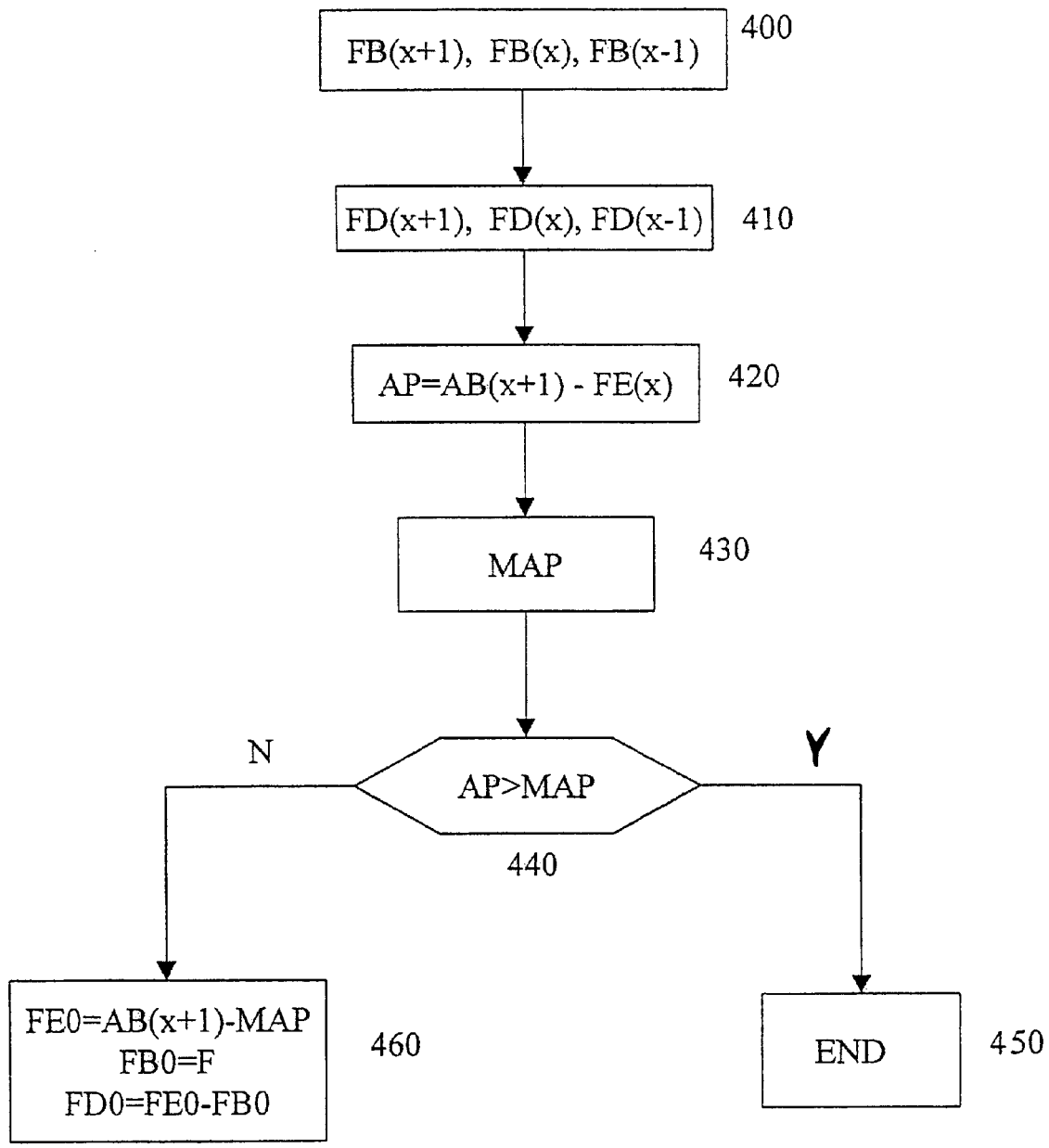
FIG. 4 shows a flowchart of the procedure according to the present invention.

The appropriate procedure is explained again below, using a flowchart in FIG. 4. Start of delivery FB(X+1) for the first partial injection, start of delivery FB(X) of the first partial injection, and start of delivery FD(X−1) of a time prior to a possibly shifted, first partial injection, are calculated in a first step 400. In step 410, the corresponding delivery periods FD(X−1), FD(X), and FD(X+1) are then fetched out of a characteristic field that is preferably four-dimensional. In the subsequent step 420, control interval AP is determined, using the start of control of the second partial injection and end of delivery FE(X) of the first partial injection. Minimum control interval MAP is then determined as a function of different operating parameters.

The subsequent interrogation 440 checks if control interval AP is greater than or equal to minimum control interval MAP. If this is the case, the program ends in step 450, i.e. is executed in a normal manner. If this is not the case, then, as described above, the data for the end of delivery of the shifted, first partial injection, the start of delivery of the shifted partial injection, and the delivery period of the shifted, first partial injection, are determined in step 460.

What is claimed is:

1. A method for controlling an internal combustion engine, the method comprising:

providing at least one first partial injection and at least one second partial injection per injection cycle;

shifting one of the first and second partial injections in response to predetermined operating conditions being active; and determining a correction value for a variable characterizing a delivery period as a function of a shift of the one of the first and second partial injections.

2. The method according to claim 1, further comprising determining a correction value using at least two pairs of values that characterize a start of delivery and a delivery period.

3. The method according to claim 1, further comprising retrieving pairs of values from a characteristic field as a function of a variable characterizing a start of delivery and at least one further variable.

4. The method according to claim 3, wherein the at least one further variable includes an engine speed and an amount of fuel to be injected.

5. The method according to claim 1, wherein the one of the first and second partial injections is shifted when an interval between the first and second partial injections is less than a threshold value.

6. The method according to claim 1, further comprising determining a correction as a function of at least two pairs of values using a linear interpolation.

7. The method according to claim 6, wherein the at least two pairs of values include a first pair of values and a second pair of values, the first pair of values including a start of delivery of one of the partial injections, the second pair of values including a start of delivery of a partial injection shifted by a maximum value.

8. A device for controlling an internal combustion engine, at least one first partial injection and at least one second partial injection being provided per injection cycle, the device comprising:

means for shifting one of the first and second partial injections in response to predetermined operating conditions being active; and means for determining a correction value for a variable characterizing a delivery period as a function of a shift of the one of the first and second partial injections.

* * * * *